Figure 1:
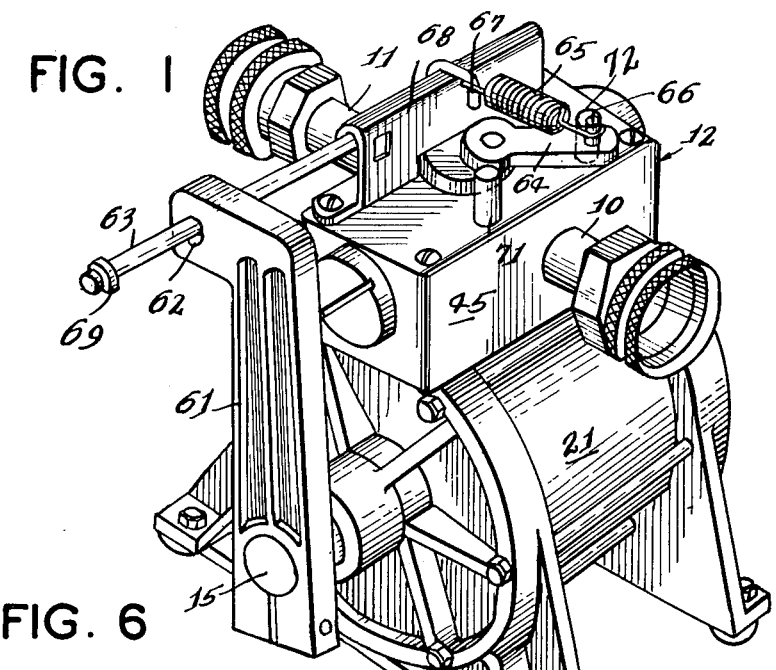

United States Patent [19]
Cordis, deceased et al.

[11] 4,004,602
[45] Jan. 25, 1977

[54] SELF-METERING DUAL PROPORTIONER

[75] Inventors: Nat Cordis, deceased, late of Silver Lake, Wis.; by Gladys S. Cordis, executrix, Chicago, Ill.

[73] Assignees: Carl F. Jensen; Gerald T. Dobie, both of Rosemont, Ill.; part interest to each

[22] Filed: June 11, 1973

[21] Appl. No.: 368,619

Related U.S. Application Data

[63] Continuation of Ser. No. 111,100, Jan. 29, 1971, abandoned, which is a continuation of Ser. No. 14,798, March 2, 1970, abandoned, which is a continuation of Ser. No. 738,764, June 7, 1968, abandoned, which is a continuation of Ser. No. 504,254, Oct. 23, 1965, abandoned, which is a continuation-in-part of Ser. No. 111,992, May 23, 1961, Pat. No. 3,213,873, which is a continuation-in-part of Ser. No. 152,204, Nov. 14, 1961, Pat. No. 3,213,796, which is a continuation-in-part of Ser. No. 380,695, July 6, 1964, Pat. No. 3,291,066.

[52] U.S. Cl. ................................................ 137/99
[51] Int. Cl.² ....................................... G05D 11/03
[58] Field of Search .............. 137/99, 540; 91/345, 91/447, 352; 92/133; 417/399, 400, 403, 404

[56] References Cited

UNITED STATES PATENTS

| 274,715 | 3/1883 | Buckley | 267/1 BE |
|---|---|---|---|
| 337,146 | 3/1886 | Gluecksmann | 267/1 B |
| 1,770,683 | 7/1930 | Davis | 137/512 X |
| 2,036,464 | 4/1936 | Dodge | 417/399 |
| 2,559,659 | 7/1951 | Redman | 417/568 X |
| 2,612,116 | 9/1952 | Lowther | 417/419 X |
| 2,751,891 | 6/1956 | Mohler | 417/399 |
| 2,803,260 | 8/1957 | Wells | 137/99 |
| 2,887,094 | 5/1959 | Krukemeier | 137/98 X |
| 3,053,500 | 9/1962 | Atkinson | 251/332 |
| 3,213,796 | 10/1965 | Cordis | 91/347 X |

FOREIGN PATENTS OR APPLICATIONS

| 231,332 | 9/1960 | Australia | 137/512 |
|---|---|---|---|

Primary Examiner—Robert G. Nilson
Attorney, Agent, or Firm—Everett A. Johnson

[57] ABSTRACT

There is here disclosed an apparatus for proportioning and blending a metered quantity of a first fluid, which provides the pumping power, with second fluids, the apparatus including an hydraulic motor, slave pump means having tandem pistons, and dual check valve assemblies associated with the slave pistons.

4 Claims, 20 Drawing Figures

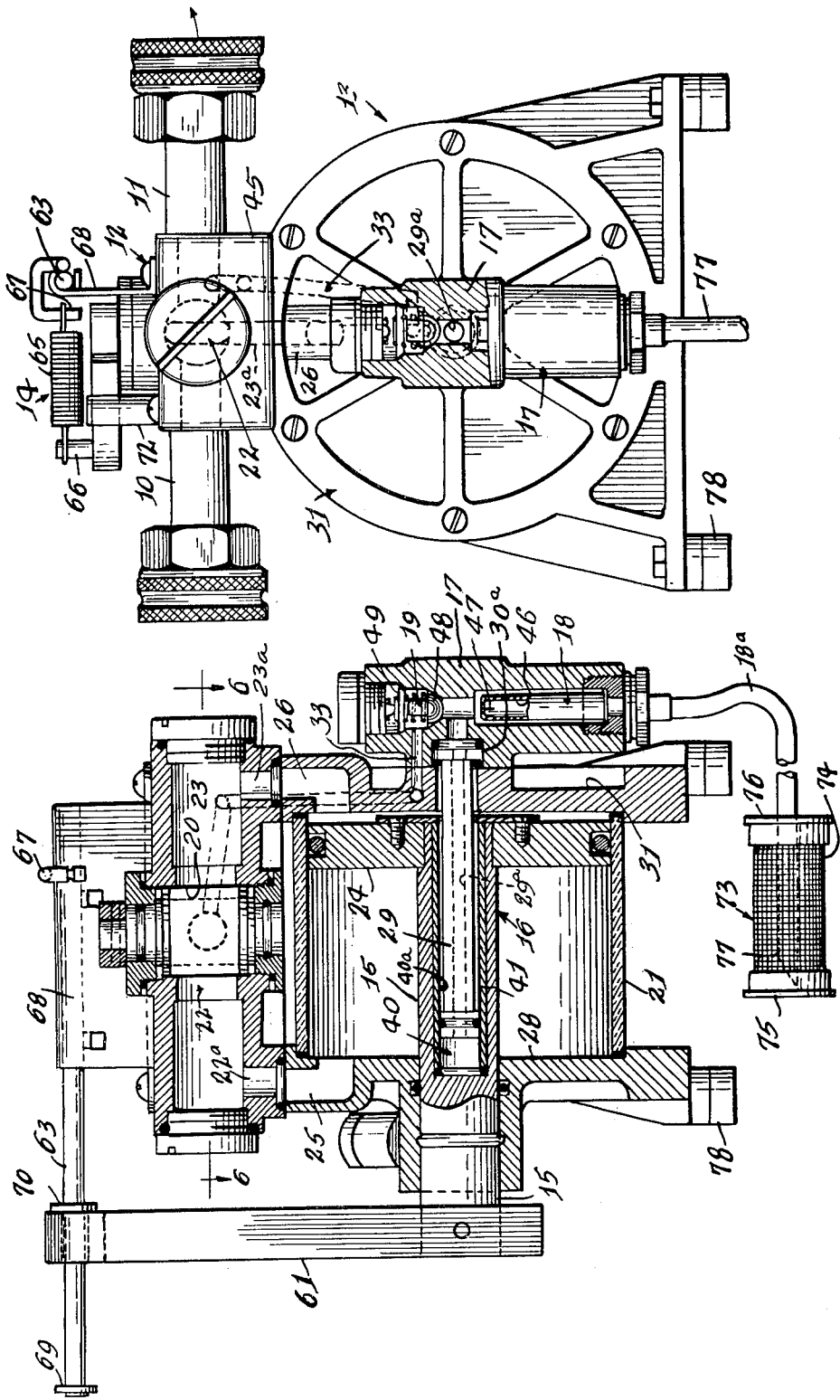

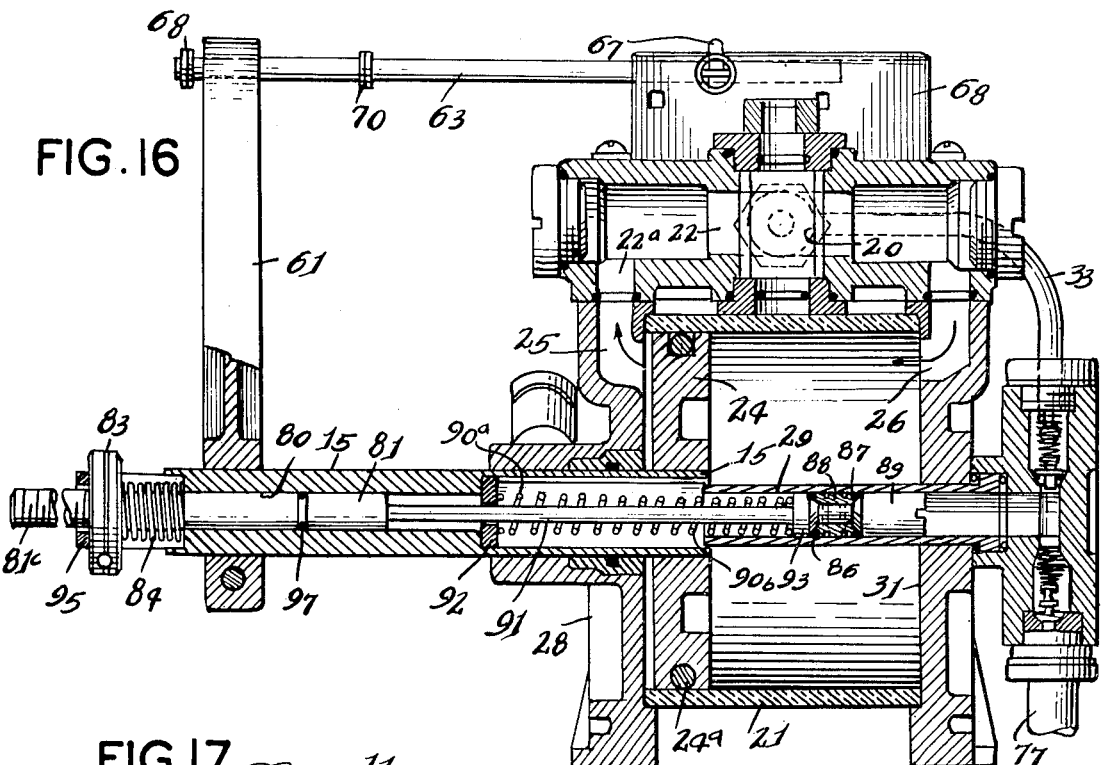
FIG. 16
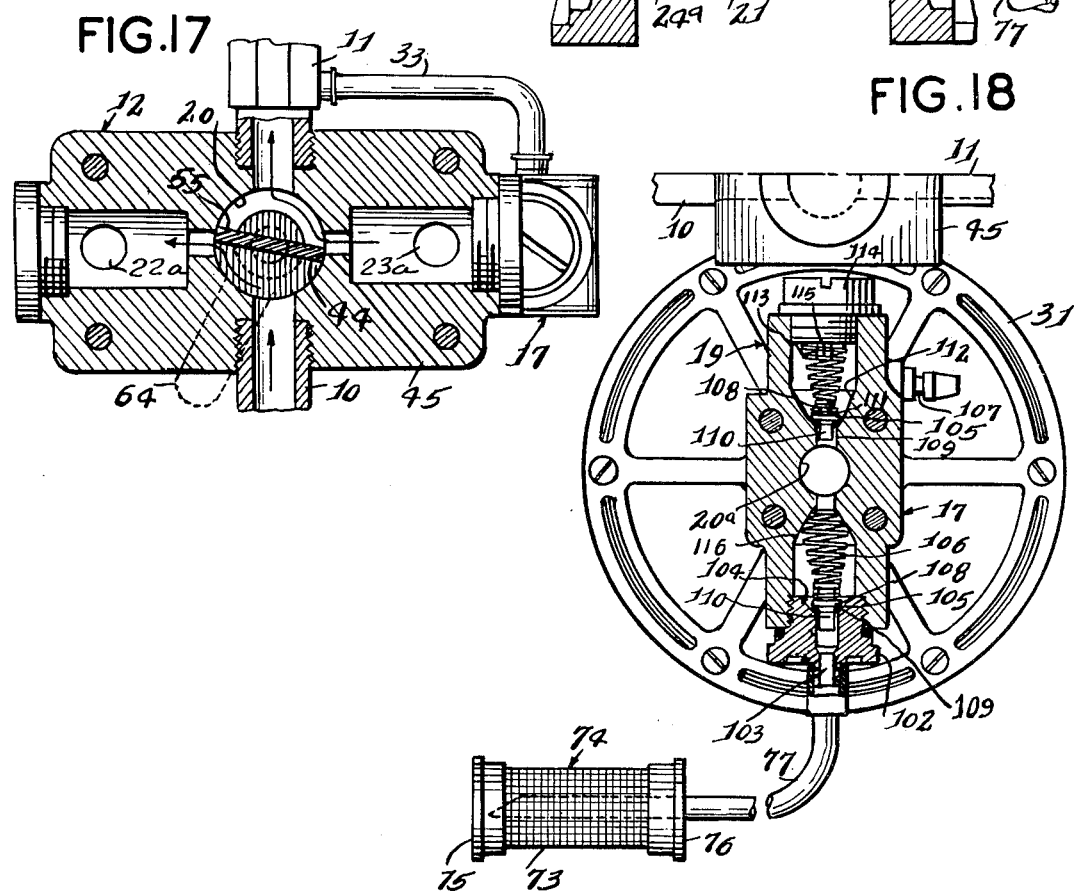
FIG. 17
FIG. 18

INVENTOR
NAT CORDIS, DECEASED
GLADYS S. CORDIS, EXECUTOR by: Everett A. Johnson
ATTY.

SELF-METERING DUAL PROPORTIONER

This application is a continuation of copending application Ser. No. 111,100, filed Jan. 29, 1971, now abandoned, which in turn is a continuation of application Ser. No. 14,798, filed Mar. 2, 1970, and now abandoned, and of application Ser. No. 738,764, filed June 7, 1968, and now abandoned, and application Ser. No. 504,254, filed Oct. 23, 1965 and now abandoned, which in turn is a continuation in part of application Ser. No. 111,992, filed May 23, 1961 and issued as U.S. Pat. No. 3,213,873 and of application Ser. No. 152,204, filed Nov. 14, 1961 and issued as U.S. Pat. No. 3,213,796, and Ser. No. 380,695, filed July 6, 1964 and issued as U.S. Pat. No. 3,291,066.

This invention relates to a self-powered fluid proportioning apparatus of the type adapted for mixing a treating fluid with a raw fluid and discharging the fluids into a distribution means. More particularly, the invention relates to a system for medicating drinking water of live stock, including poultry, wherein a stream of water powers the apparatus.

Many types of equipment have heretofore been proposed for feeding one fluid, including drugs, vaccines, nutrients, sanitizing, deodorizing, and softening materials and the like into a second fluid stream such as water. Such prior systems, however, have been complicated in construction, unreliable in operation, cumbersome in use, not adapted for both portable and automatic continuous installation, or have not been self-powered.

A primary object of the invention is to provide a system for feeding a first fluid into a second fluid in selected proportions over a wide range of pressures and flow rates of the second fluid. An additional object of the invention is to provide an efficient and reliable device which is portable and rugged. Another object of the invention is to provide a system which requires no power for operating the apparatus other than the flowing stream being treated. It is a further object of the present invention to provide new and novel self-powered apparatus for continuously and automatically treating raw water streams with a fluid treating agent. It is also an object of the invention to provide an apparatus particularly adapted for use in medicating the drinking water of poultry and for delivering the treated water under pressure into the water distribution system, such as a system including drinking troughs having float-controlled inlet valves. These and other objects of the invention will become apparent as the description thereof proceeds.

Briefly, according to the present invention, we provide a self-propelled fluid blending or treating apparatus which includes a hydraulic master motor means operated by a primary raw fluid to be treated, a slave pump means for the treating fluid actuated by such motor, and a delivery manifold means through which the fluid used to operate the motor and the treating fluid from the slave pump are discharged. Such delivery manifold means may include a mixing chamber.

Figure 6:
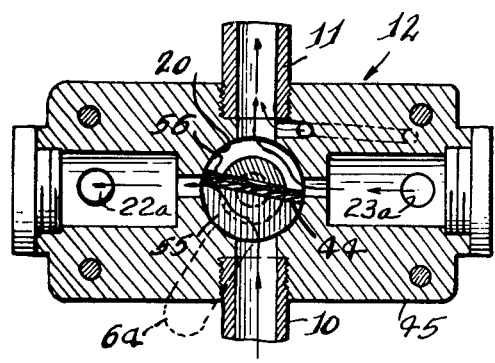
Figure 7:
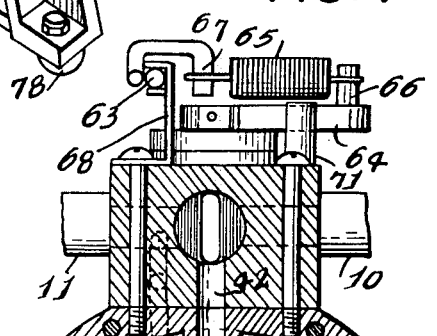
Figure 8:
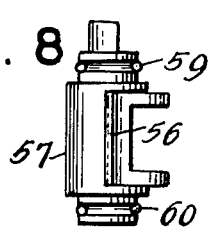
Figure 10:
Figure 9:
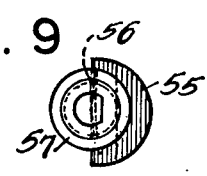
Figure 11:
Figure 4:
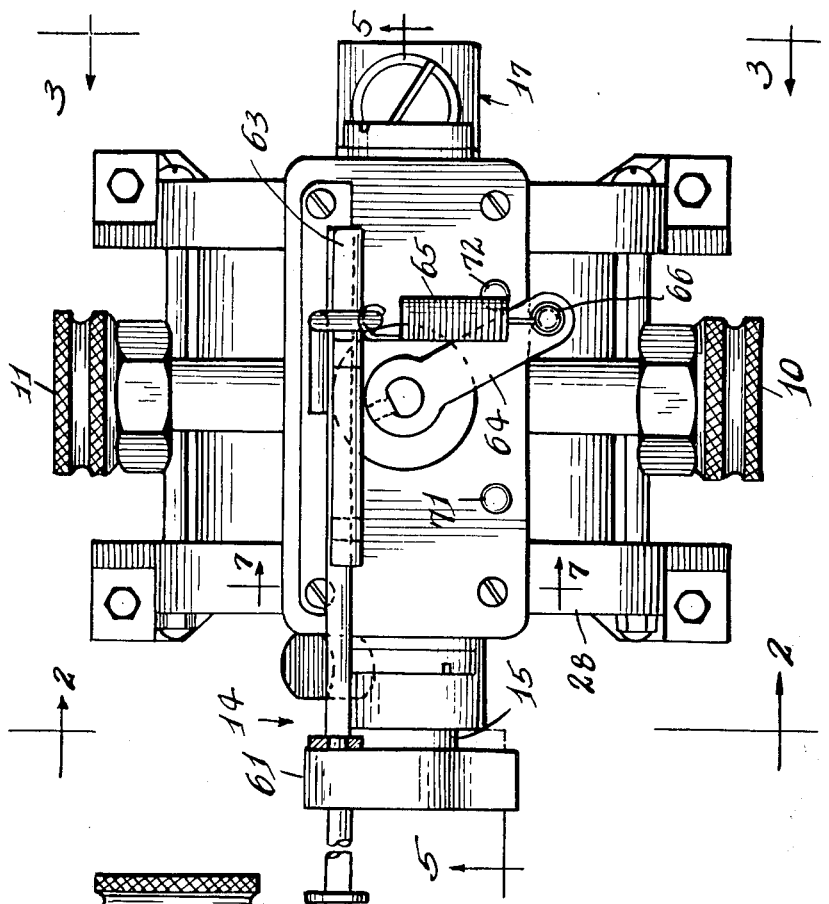
Figure 2:
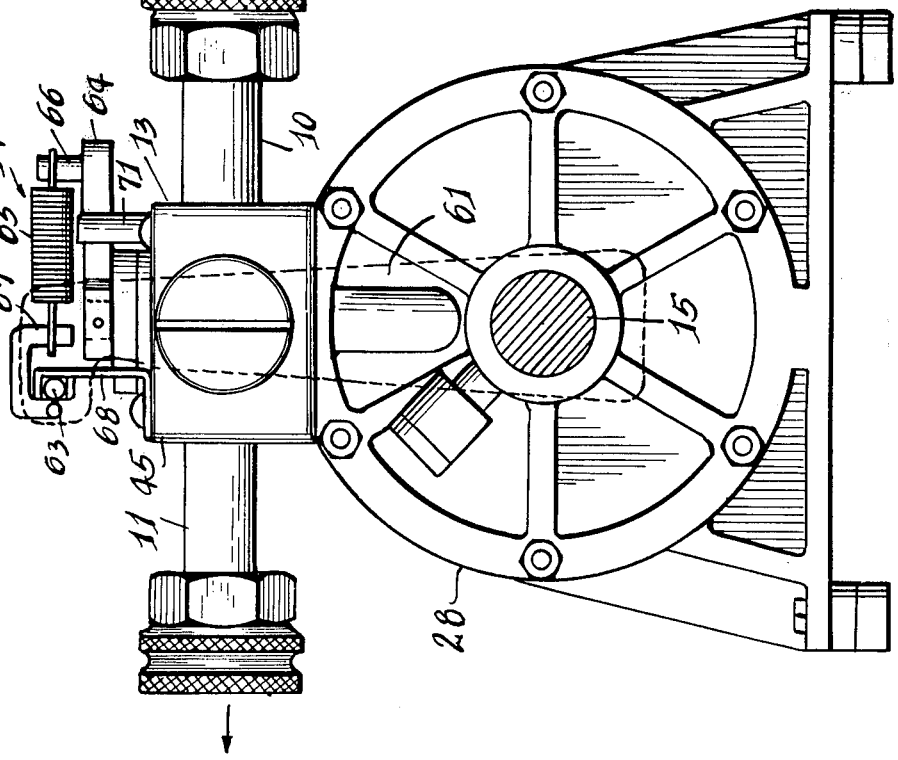
Figure 12:
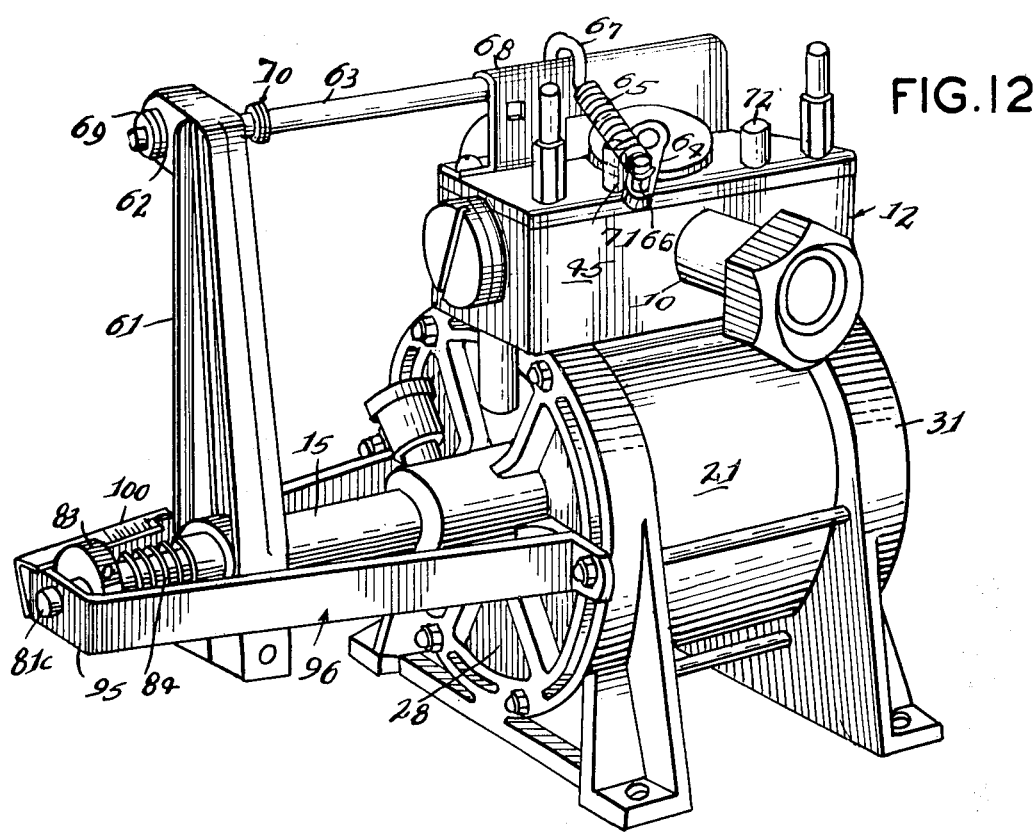
Figure 13:
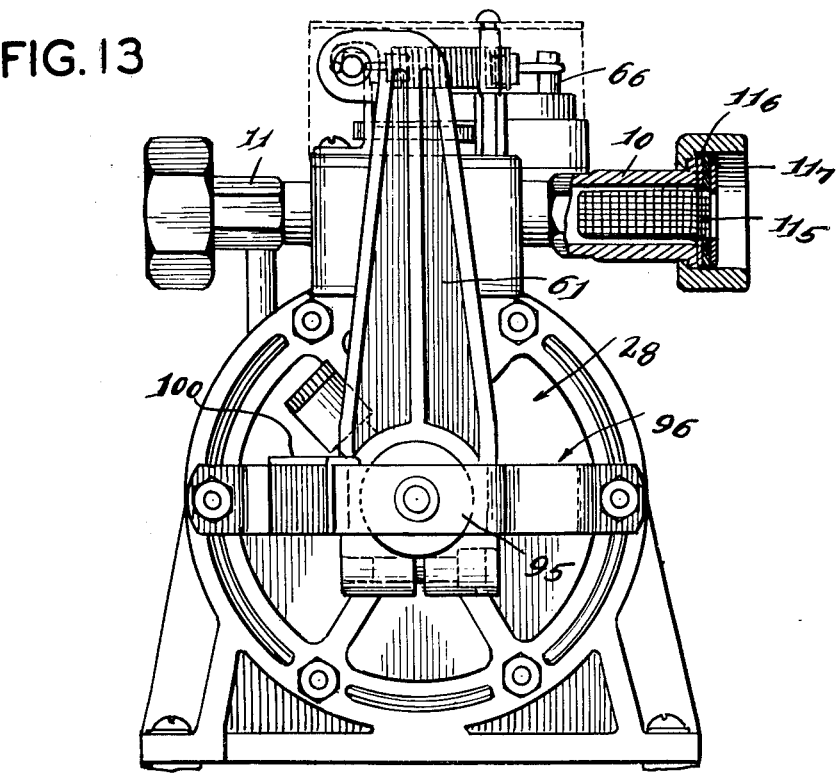
Figure 14:
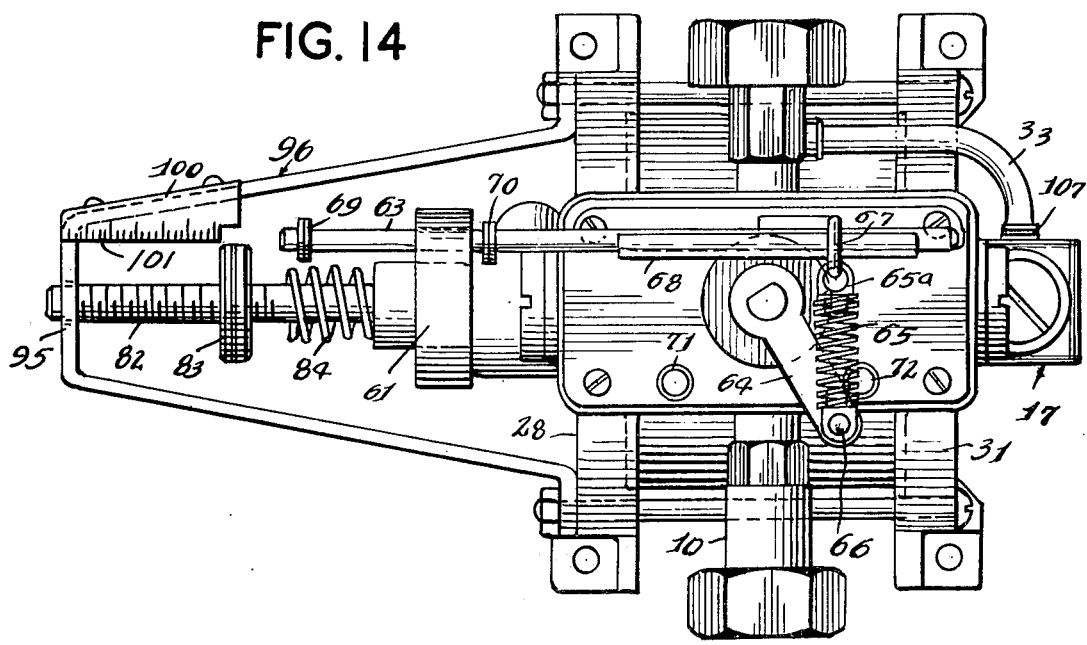
Figure 15:
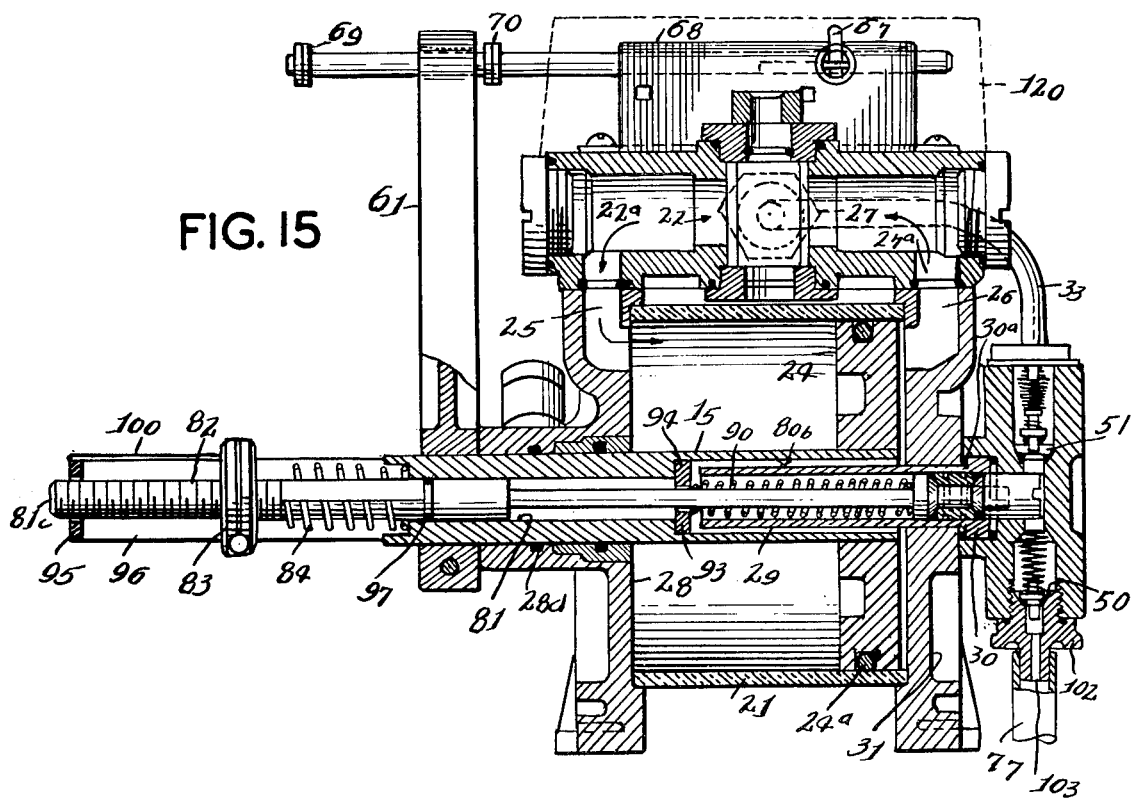
Figure 19:
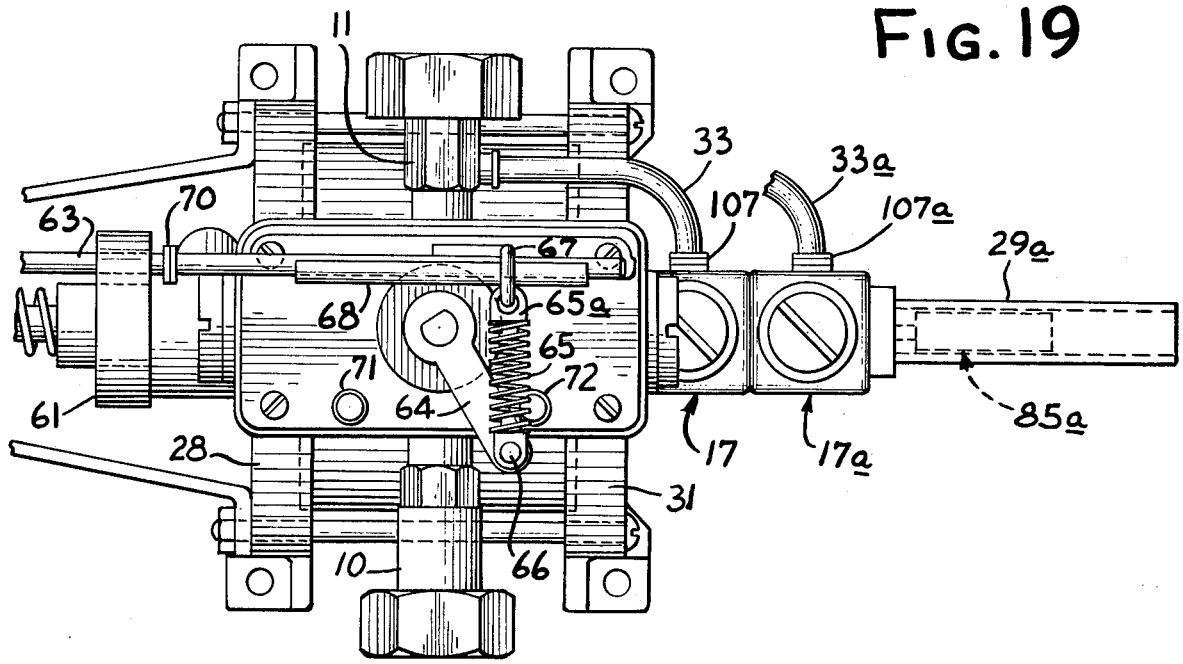
Figure 20:
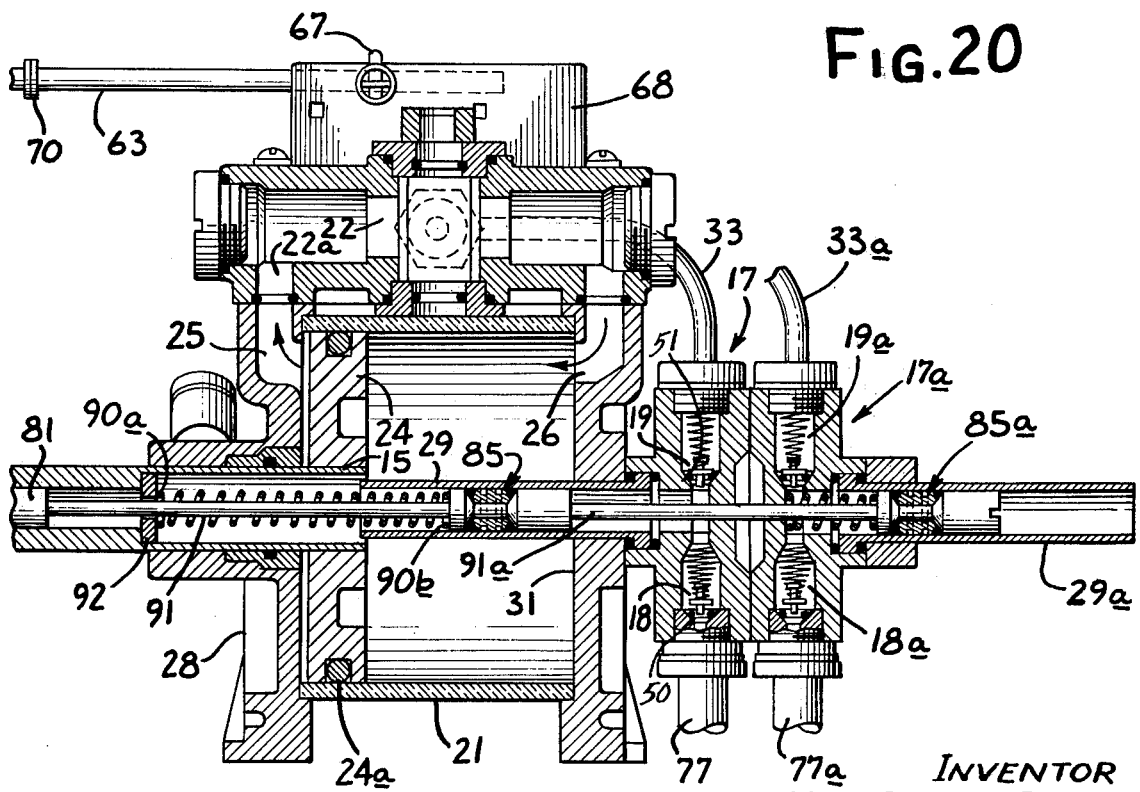

The slave pump and hydraulic motor comprise a unitary system wherein piston means in the hydraulic motor is provided with a cylindrical chamber reciprocatable along or over a fixed slave hollow pump plunger. A pumping chamber having check valve means communicates with the fixed hollow plunger and the treating agent and the water are discharged into the delivery manifold means wherein the fluids become intimately mixed. Details and advantages of the apparatus, in accordance with this invention, will be described by reference to the accompanying drawings wherein:

FIG. 1 is an elevation in perspective;
FIGS. 2 and 3 are opposite end elevations;
FIG. 4 is a top view;
FIG. 5 is a vertical section taken along the line 5—5 in FIG. 4;
FIG. 6 is a section taken through the valve block along the line 6—6 in FIG. 5;
FIG. 7 is a section taken along the line 7—7 in FIG. 4;
FIGS. 8 through 11 illustrate details of the gating valve mechanism of FIGS. 5 and 6.
FIG. 12 is an elevation in perspective;
FIG. 13 is an end elevation;
FIG. 14 is a top view;
FIGS. 15 and 16 are side elevations, partly in section;
FIG. 17 is a section through the upper valve block of FIGS. 15 and 16;
FIG. 18 is an enlarged fragmentary end view showing details of the pump valve means of FIGS. 15 and 16; and
FIGS. 19 and 20 are, respectively, a top view and a side elevation, partly in section of another embodiment of the invention.

Corresponding components in FIGS. 1–11 and in FIGS. 12–20 are designated by like reference numerals.

Referring to the drawings, the apparatus illustrated includes the water inlet 10, the water outlet conduit 11, the water-gating assembly 12, the water motor 13, connecting rod 15, slave pump 16, and treating agent valve chamber means 17 having inlet check valve 18 and outlet check valve 19.

The water enters the valve chamber 20 in the water-gating assembly 12 through water inlet 10 and is gated into the motor body 21 via ports 22 or 23 to apply fluid pressure on alternate sides of the motor piston 24 via channel 25 or 26. The slave pump 16 comprises a connecting rod 15 carried by the piston 24, rod 15 passing through one end wall 28 of the motor body 21. The tubular pump plunger 29 is mounted by an end flange 30 in the opposite wall 31 of the motor body 21 and is provided with the O-ring gaskets 30a on both sides of the flange 30, as shown in FIG. 5.

The slave pump check valve assembly 17 fixed to the end wall 31 contains the inlet and outlet check valves 18 and 19, the inlet connection 32 and the outlet channel 33. A bore 40 in an end of connecting rod 15 accommodates the fixed tubular pump plunger 29, the cylinder 40 operating to-and-fro over the plunger 29 having O-ring 41 in response to the movement of the motor piston 24. The cylinder 40 is preferably provided with glass liner 40a. The piston 24 is driven by the water entering the gating system 12, to be expelled by the piston 24 alternately through channels 22a and 23a, shunt valve 55 and the water-gating assembly 12 which discharges through outlet conduit 11.

When the connecting rod 15 moves the cylinder 40 away from the pumping plunger 29, treating fluid is drawn into the treating agent valve assembly 17 through the "open" inlet check valve 18 and at the same time the suction produced by the withdrawal of the cylinder 40 about the hollow plunger 29 closes the outlet check valve 19, which when subsequently opened discharges through the manifold block 45 via channel 33 and outlet conduit 11.

When the direction of travel of the pumping cylinder 40 is reversed over the hollow plunger 29 in following the motion of the motor piston 24 through the rigid connecting rod 15, the inlet check valve 18 closes and the outlet check valve 19 opens so that the treating fluid trapped in the pumping barrel 29a within plunger 29 and cylinder 40 is ejected under pressure into outlet conduit 11 via channel 33. The water and medication leave the water-gating assembly 12 in a proportion based upon the displacement volume of the slave pump 16 and the volume of the motor chamber 21 on either side of the motor piston 24. The proportions of raw fluid (water) to treating agent (drug) can be preadjusted by selection of the dimensions of bore 40, barrel 29a, etc.

If desired, a multiplicity of check valve-pump assemblies may be provided and actuated by the water motor 13. In this way several types of treating agents or additives may be blended with the water at the same time.

The pumping valve assembly 17 houses the inlet check valve 18 and the outlet valve 19. The inlet check valve 18 comprises a deformable hollow cylinder 46 having a self-closing port 47. The outlet check valve 19 comprises a plug 48 held by spring 49 against the valve seat 50. A delivery channel 51 communicates with the valve block 17 above the spring-loaded plug 48 and discharges by channel 33 into the outlet conduit 11.

The slave pump 16 includes the connecting rod 15 for piston 24 with its pump cylinder bore 40. The treating fluid plunger 29 is tubular with an internal pumping channel 29a. An O-ring 41 on the free end of the pumping plunger 29 engages the wall of the pump cylinder 40 to provide a pumping seal.

On a suction stroke of the pumping cylinder 40 the elastic cylinder 46 of inlet check valve 18 expands to open the port 47; and the plug 48 on the outlet check valve 19 is held over the outlet port 19a. When the pumping cylinder 40 is on the ejection stroke, this situation is reversed so that the plug 48 is lifted and the port 47 in cylinder 46 is closed.

The gating assembly 12 includes a valve plug 55, the valve leaf spring 56, and the valve shaft 57 disposed within the valve chamber in the valve block 45. These components are shown in detail and in subassembly by FIGS. 6 through 11 in the drawings. In FIG. 6, the valve block 45 is shown in cross-section and illustrates the alternate positions of plug 55 and flows through the channeled block.

Opposite ends of the valve shaft 57 are provided with O-rings 59 and 60 to effect a fluid-tight seal. The valve plug 55 is shifted from two extreme positions, alternately closing and exposing the ports 22 and 23 leading to channels 22a and 23a, respectively, which direct the flowing fluid to opposite sides of the motor piston 24.

The connecting rod 15 projects through the end wall 28 and supports the actuating arm 61 which terminates at its upper end in a bore 62 through which the reversing rod 63 passes. A pair of C-rings 69 and 70 on the reversing rod 63 comprise travel stops contacted by the arm 61 for shuttling the reversing rod 63 between its positions.

The upper end of the valve shaft 57 is provided with a toggle lever 64 which is actuated by coil spring 65 anchored at one end to the post 66 carried by the free end of toggle lever 64, and is anchored at its other end by the inverted post 67 which is fixed to the shiftable reversing rod 63 which is slidably carried within the guide 68 secured to the water-gating assembly 12.

When the actuating arm 61 contacts either of the stops 69 or 70, the movement of the actuating arm 61 is imparted to the reversing rod 63 which in turn shifts the spring anchor post 67 with the result that the spring 65 swings about the post 66 carried by the toggle lever 64 until there has been sufficient travel thereof to shift the toggle lever 64 by the action of the spring 65. When this occurs, the valve shaft 57 is rotated and referring to FIG. 6 moves the valve plug 55 to one of two diverting position. The travel or throw of the free end of the toggle lever 64 is controlled and restricted by posts 71 and 72 fixed to the water-gating assembly 12.

As the piston 24 travels in the motor cylinder 21 the connecting rod 15 carries the actuating arm 61 with it causing the toggle lever 64 to pivot between the two positions determined by the posts 71 and 72. At the limits of travel of the reversing rod 63, the shunt valve 55 is placed in the alternate positions as shown in the drawings. This causes the water to course through the channels 42 or 43 leading to the opposite sides of the piston 24 thereby displacing the piston 24 to opposite ends of the motor cylinder 21 and actuating the slave pump 16 as described.

A further embodiment of the apparatus which is variable, is provided with an adjustable slave pump head, and includes substantially identical opposed check valves as illustrated in the drawings.

The motor piston 24 within motor cylinder 21 has tubular connecting rod 15 fixed to it and projecting axially of end wall 28. The connecting rod 15 contains bore 80 accommodating the adjustable shaft 81, which includes the threaded portion 82, the adjustment nut 83, the balancing spring 84 about the shaft 81, the slave pump plunger head 85. The head 85 has O-rings 86 and 87, the expandable chevron seal 88, and threaded end plug 89 which is drawn up on the shaft, with the O-rings expanding the chevron seal 88 for the proper draw in the pumping barrel 29.

The spring 90, arranged about the constricted portion 91 of the shaft 81, has one end 90a abutting the plunger shoulder 92 and the other end 90b acting against collar 93 floating on the shaft 81 to abut shoulder 94 within the bore 80 in propelling slave plunger head 85 after compressing spring 90. The slave pump plunger head 85 operates within the cantilever-mounted slave pumping barrel 29 which is extendable within the chamber 80b. The exposed end 81c of the shaft 81 has its threaded portion 82 extending through stop yoke 95, forming part of the bracket 96 fixed to the end plate 28 of the motor housing 21. The adjustment of the above components determines the time lag in the operation of the slave pump in relation to the travel of the piston 24. Thus adjusting proportioning nut 83 to one extreme of its travel abuts the stop yoke 95 which is the minimum or decreased proportion position.

Moving the proportioning nut 83 outwardly of the end 81c of the shaft 81 decreases the proportion delivered by the slave pump 16, and positioning the proportioning nut 83 inwardly of the yoke 95, to contact spring 84, increases the quantity of the fluid delivered by the slave pump 16; in these adjustments the lengths of springs 84 and 90 are altered whereby the necessary movement of the piston 24 to actuate the slave plunger 40 in suction and delivery strokes is adjusted. However, a pre-set lost motion linkage may be used.

The shaft 81 within the bore 80 in the connecting rod 15 is fluid-sealed by an O-ring 97. The hollow shaft or rod 15 with its cylindrical chambers 80a, 80b and 80c accommodating the spring 90, the shaft 81 having threaded portion 82 on which the proportioning nut 83 runs and axially adjusts the delayed projection and retraction of the slave plunger, when taken together comprise an adjustable connecting rod means 15 by which the motion of the motor piston 24 is imparted to the slave plunger head 85 relative to the cantilever pump barrel 29 which is axially aligned with the connecting rod 15 and reciprocates therewithin.

A proportioning scale 100 may be carried by the bracket 96 with indicia 101 thereon correlated with the settings of the proportioning nut 83, whereby selected proportions of raw power fluid, such as water, and of the treating fluid delivered by the slave pump 16 are selected and blended.

Thus there is provided a system for treating or blending fluids in selected variable proportions. However, a fixed ratio proportioner is contemplated which may be a composite of components from the illustrated apparatus. Thus, the apparatus includes a fluid motor comprising a cylinder, a piston, a piston connecting rod means 15 for power take-off, and a fluid gating means 12 in combination with a slave pump means 16 comprising a treating fluid valving means, a slave pump barrel projecting axially of the motor cylinder, a slave plunger means carried within the slave pump barrel which communicates with the treating fluid valving means. Slave pump plunger adjusting means may be provided exterior of the motor housing whereby the proportions of raw fluid and treating fluid blended therewith can be varied, even during operation of the device.

A novel check valve assembly 17, shown in detail by FIGS. 15, 16, and 18, includes, a lower inlet check valve plug 46, a lower valve screw cap 102 having an inlet channel 103 and a tapered plug seat 104. The inlet to check valve assembly 17 includes a plug 46 having a body portion 105 and a double-coned spring 106 extending between the plug 18 and the tapered seat 116. A transverse chamber 20a comprises an extension of the pumping channel 29a in the slave cylinder 29, and the plug 89 on the end of the slave plunger 40 projects into chamber 20a on each ejection stroke to displace all fluids from the assembly 17 through the outlet check valve 19 and discharge them via nipple 107, line 33, and outlet conduit 11.

The upper end of the discharge valve cavity 113 is closed by screw cap 114 having an axial inward projection 115. Outlet poppet plug 48 comprises a body portion 105 having an upper axial projection 108, an O-ring seal 109, and a depending guide stem 110. A tapered or double coned spring 111 engages the axial projections 115 and 108 and urges the O-ring 109 on plug 48 against the tapered seat 51. The lower inlet poppet valve plug 46 comprises corresponding components; however, it will be understood that the normally closed check valves 18 and 19 are in opposed array so that the inlet valve 18 opens on the suction stroke (with 19 closed) and the outlet valve 19 opens (with 18 closed) on the delivery stroke.

In operation, the intake assembly 73 connected to the inlet end of the conduit 77 is placed within a vessel containing the treating agent. The assembly 73 includes a cylindrical strainer screen 74 and two end plates or caps 75 and 76, one of which is provided with a port to receive the tubing or conduit 77. The assembly may be weighted with a ball bearing or the like so as to assure that the inlet end of the conduit 77 remains near the bottom of the vessel.

Reverting to the possibility of multiple slave pump/check valves assemblies, it is apparent that two or more heads 85 can be arranged axially in tandem on the rod 81 with an additional check valve assembly 17 and pumping cylinder. When the check valve blocks 17 are arranged back-to-back, the delivery to outlet conduit 11 through lines 33 and 33a will be continuous and alternately from the two pump assemblies in such an array.

Referring to FIGS. 19 and 20, the slave plunger means comprises a pair of axially spaced plunger heads 85 and 85a carried by slave plunger rod 81, each with its own check valve assembly 17 and 17a; and each such assembly discharges through its own outlet lines 33 and 33a into the outlet conduit 11.

In operation the plunger heads 85 and 85a alternately actuate inlet valve 18 of assembly 17 and outlet check valve 19a of assembly 17a; and outlet check valve 19 and inlet check valve 18a as described herein with reference to FIGS. 14, 15, 16, and 18.

As described herein, mixed fluids are discharged from the outlet conduit 11. If desired, an auxiliary mixing chamber (not shown) may be provided but ordinarily this is not necessary, the proportioner providing adequate agitation and mixing of fluids.

The accompanying drawings show numerous details of construction which have not been designated by individual reference numerals. However, it will be apparent to one skilled in the art that such details, including grease cups, hose connectors, screws, etc. are conventional and need not be described in detail.

Materials of construction will be selected to be compatible with the fluids. For example, with corrosive treating agents stainless steel or nylon pumping plunger head 85 may be used in a glass or stainless steel pumping barrel, and the check valves 18 and 19 in assembly 17 may be of plastic or stainless steel. Other metals provided with ceramic or plastic coatings may also be used.

Although the invention has been described with reference to particular embodiments thereof, it should be understood that this is by way of illustration only and that modifications therein may be made in view of the teachings without departing from the spirit and scope of the invention.

What is claimed is:

1. A unitary self-metering multifluid proportioning apparatus comprising constant displacement hydraulic motor means including a housing having first and second end walls; master piston means operating within said housing; a connecting rod carried by the master piston means and passing through the first end wall of the housing; constant displacement slave pump means carried by said second end wall and including a tubular pump cylinder mounted in the said second end wall; a slave plunger axially aligned with said master piston means and operating within said tubular pump cylinder; said slave plunger means being in driven association with said connecting rod; a water supply inlet and delivery conduit means connected to said housing; a water gating assembly on said housing interposed said water supply inlet and said motor means gating water to alternate sides of said master piston means operating within said housing; spring loaded lever means mounted on said water gating assembly and linked to a reversing rod; linkage means between the connecting rod and the said reversing rod whereby the reversing rod and the slave plunger follow the reversible motion of the master piston means; a flow control within said water gating assembly shifted by said spring loaded lever means; and slave pump check valve assembly means supported by the said second end wall and containing an inlet connection, and an outlet conduit means, said outlet conduit means discharging additive fluid directly into said delivery conduit means; and wherein said slave pump check valve assembly comprises a valve means carrying a plug on its upstream side and a self-centering, flow-through, double-coned coil spring on its downstream side, said double-coned spring having tapered end portions and an intermediate enlarged portion of maximum coil girth, and a ported bridge wall across the flow path through said slave pump check valve, a tapered recess on the upstream side of said bridge wall and terminating in a port therein, said tapered recess receiving and aligning the downstream cone end of said coil spring.

2. A unitary self-metering multifluid proportioning apparatus comprising constant displacement hydraulic motor means including a housing having first and second end walls; master piston means operating within said housing; a connecting rod carried by the master piston means and passing through the first end wall of the housing; constant displacement slave pump means carried by said second end wall and including a tubular pump cylinder mounted in the said second end wall; a slave plunger axially aligned with said master piston means and operating within said tubular pump cylinder; said slave plunger means being in driven association with said connecting rod; a water supply inlet and delivery conduit means connected to said housing; a water gating assembly on said housing interposed said water supply inlet and said motor means gating water to alternate sides of said master piston means operating within said housing; spring loaded lever means mounted on said water gating assembly and linked to a reversing rod; linkage means between the connecting rod and the said reversing rod whereby the reversing rod and the slave plunger follow the reversible motion of the master piston means; a flow control within said water gating assembly shifted by said spring loaded lever means; slave pump check valve assembly means supported by the said second end wall and containing an inlet connection; outlet conduit means, said outlet conduit means discharging additive fluid directly into said delivery conduit means; said tubular pump cylinder extending axially within said housing from said second end wall, said slave plunger comprising axially spaced dual plunger heads operating within said tubular pump cylinder; and said slave pump check valve assembly means comprising two inlet and outlet check valve assemblies operatively associated with said plunger heads, each outlet of said inlet and outlet check valve assemblies discharging separately through said outlet conduit means.

3. A self-metering dual proportioning apparatus for multiple fluids which comprises fluid supply conduit means, constant displacement master hydraulic motor means including a motor cylinder to which said fluid supply conduit means is connected through a fluid gating assembly on said motor means interposed said fluid supply inlet and said motor cylinder, displacement slave pump means, delivery conduit means, said slave pump means and said master motor means separately discharging into said delivery conduit means to provide a proportioned mixture of fluids flowing separately from said motor means and flowing from said slave pump means, said slave pump means comprising a fixed tubular pumping chamber, master piston means in said motor means, and a connecting rod, said fixed tubular pumping chamber being mounted through an end wall of said motor means within said motor cylinder in axial alignment with said master piston means, slave plunger means reciprocating in said tubular pumping chamber, said slave plunger means being in driven association with said connecting rod and projecting through the master piston means as said master piston means traverses the motor cylinder from end to end and as said slave plunger means is operated within said fixed tubular pumping chamber; said tubular pumping chamber extending axially from said motor cylinder through said end wall and said slave plunger means including a pair of spaced heads; and separate inlet and outlet check valve assemblies on said tubular pumping chamber extension with a ported wall between said assemblies and separating said heads.

4. The self-metering dual proportioner of claim 3 wherein said motor means includes a spring delayed linkage between the master piston means and the slave plunger means.

* * * * *